Figure 1:
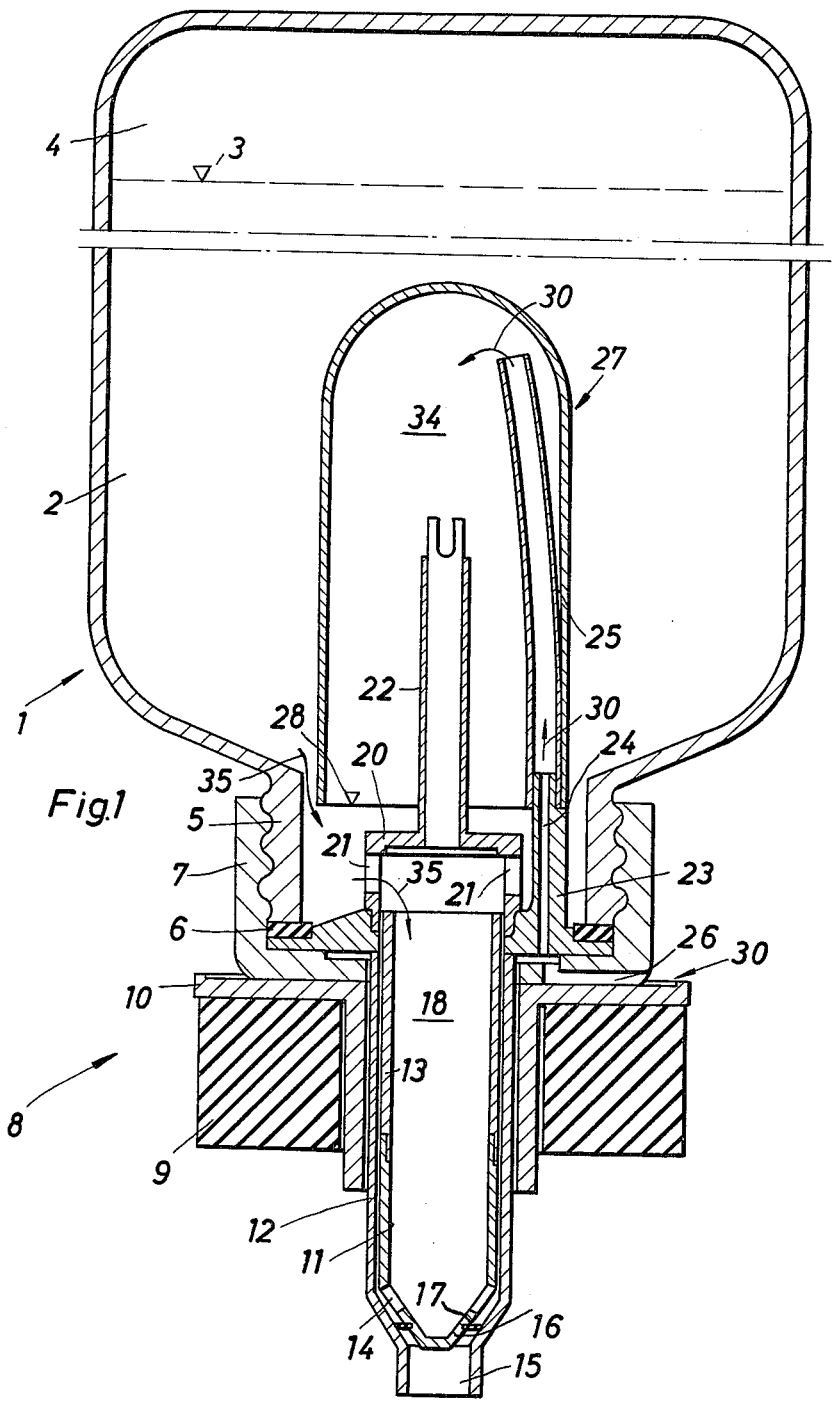

United States Patent [19]

Kuckens et al.

[11] 4,109,829

[45] Aug. 29, 1978

[54] CONTAINER FOR METERED DISPENSING OF LIQUID

[75] Inventors: Alexander Kückens, Hamburg; Horst Köhl, Reinfeld, both of Fed. Rep. of Germany

[73] Assignee: DAGMA Deutsche Automaten- und Getränkemaschinen- Gesellschaft mit beschrankter Haftung & Co., Reinfeld, Fed. Rep. of Germany

[21] Appl. No.: 726,455

[22] Filed: Sep. 24, 1976

[30] Foreign Application Priority Data

Oct. 6, 1975 [DE] Fed. Rep. of Germany ....... 2544671

[51] Int. Cl.² ............................................. B67B 7/24
[52] U.S. Cl. ..................................... 222/81; 137/588; 222/442; 222/453
[58] Field of Search ................. 222/80, 81, 91, 332, 222/333, 425, 442, 453, 504, 526, 537; 137/588

[56] References Cited

U.S. PATENT DOCUMENTS

| | | | |
|---|---|---|---|
| 1,559,274 | 10/1925 | Morris | 222/80 |
| 2,612,300 | 9/1952 | Mathews | 222/442 X |
| 2,887,255 | 5/1959 | Baverlein | 222/453 |
| 2,895,652 | 7/1959 | Rockriver | 222/504 X |
| 2,977,028 | 3/1961 | Joffe | 222/442 |
| 3,072,302 | 1/1963 | Giovannoni et al. | 222/453 X |
| 3,258,166 | 6/1966 | Kuckens | 222/70 |
| 4,015,755 | 4/1977 | Lerner et al. | 222/442 |

*Primary Examiner*—Robert B. Reeves
*Assistant Examiner*—Fred A. Silverberg
*Attorney, Agent, or Firm*—Whittemore, Hulbert & Belknap

[57] ABSTRACT

A container for metered dispensing of liquid. The container in an inverted orientation is connected at its withdrawal and venting aperture to an electromagnetically actuated metering valve, wherein the metering valve has a movable valve element. Within the inverted container there is a cup-shaped vessel having a tear-off cover which simultaneously forms the closure of the container and has its rim sealingly connected to the rim of the withdrawal and venting aperture.

8 Claims, 7 Drawing Figures

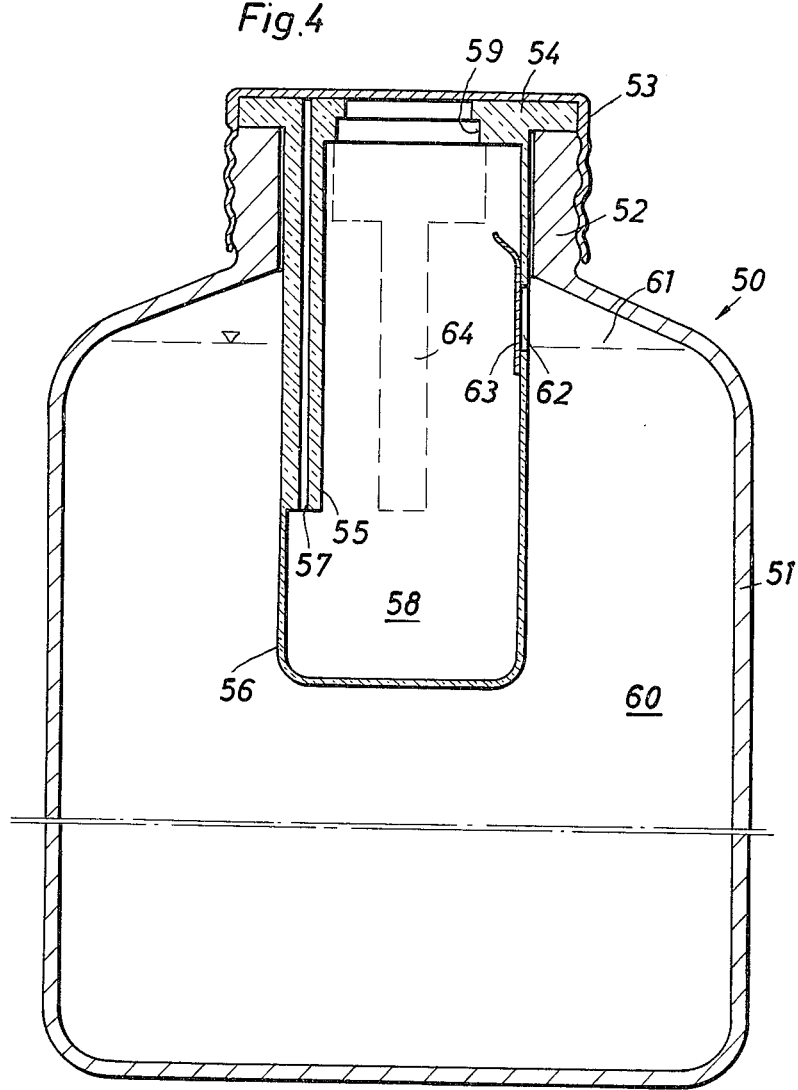

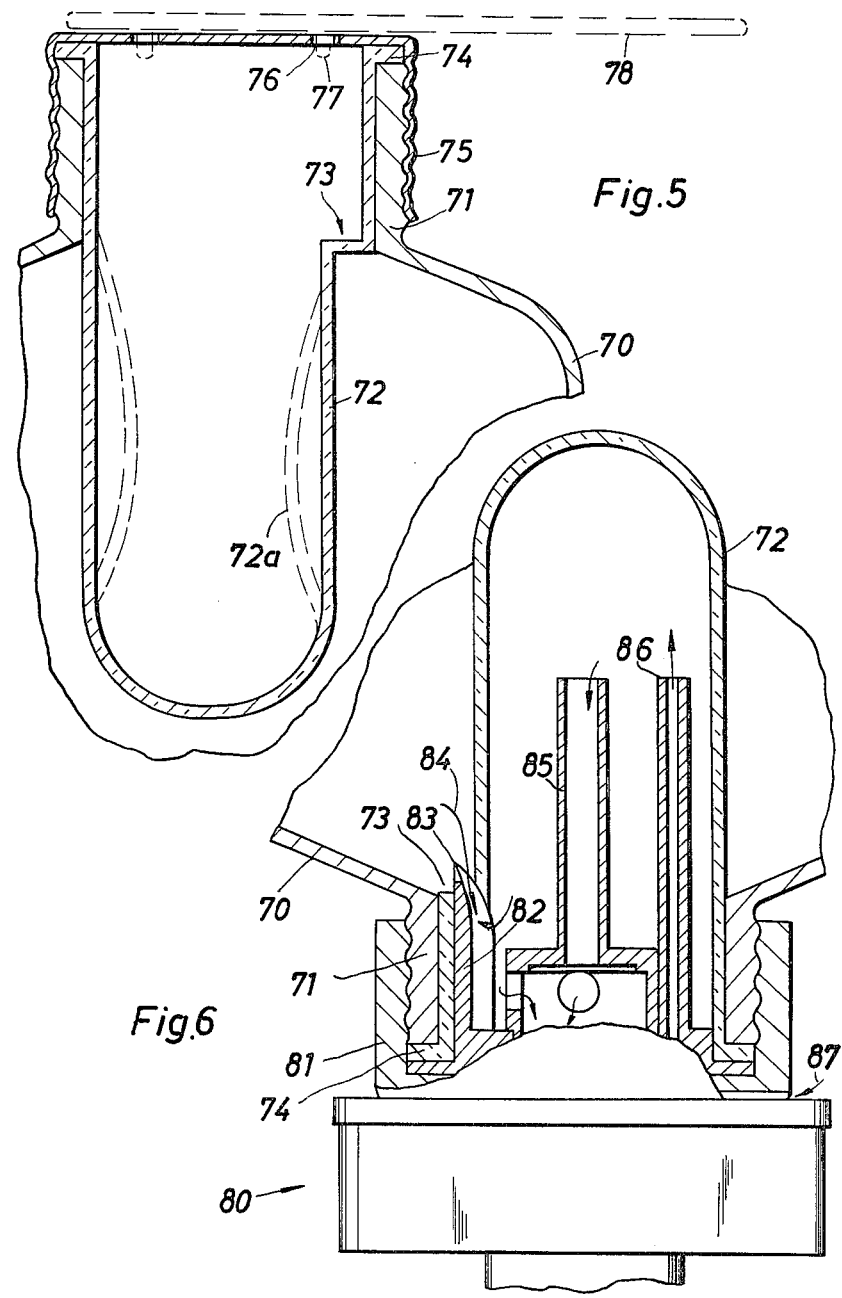

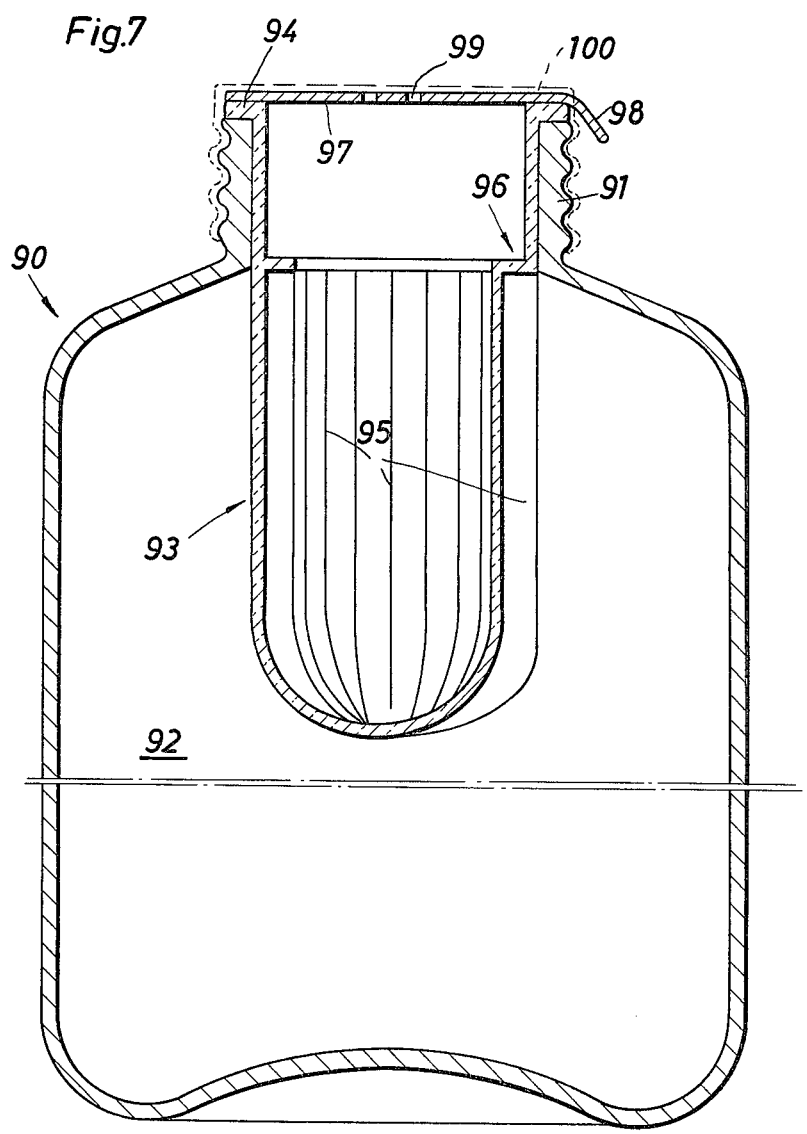

CONTAINER FOR METERED DISPENSING OF LIQUID

The invention relates to a container for metered dispensing of liquids, in particular for freezable or self-preserving liquids for the production of beverages, comprising a withdrawal and venting opening which is downwardly directed in the withdrawal position and is connectable to a metering system.

There are many spheres of application in which it is necessary to draw or dispense a liquid in predetermined volumetric quantities in doses from a stock. Such liquids may have widely differing properties and consistencies and may serve the most varied purposes of application. The metered dispensing of liquids is for instance required in chemical processes, upon mixing of paints and in the production of medicinal preparations.

The present invention is however primarily concerned with the production of potable liquids, wherein a syrup or concentrate is combined in metered quantities with water and/or other ingredients, to obtain a beverage of particular taste characteristic and consistency.

Syrup or concentrate for the preparation of beverages may have widely differing flow properties in their initial state and are affected by different preservation conditions. It is an object of the present invention to propose a metering device which is appropriate in equally satisfactory manner for all these liquid substances of different nature, to allow of a precise metering of predetermined quantities from a stock.

The simplest known metering method consists in that the liquid which is to be metered is allowed to flow out of a stock through an outflow aperture of predetermined cross-section, during a predetermined period. In this case, the withdrawal of precise predetermined quantities of liquid depends however on the condition that the flow velocity or the viscosity of these substances do not change. It is known however in the case of numerous liquids, in particular in the case of beverage syrup, which has a sugar content of greater or lesser magnitude, that the viscosity depends on the prevalent temperature. So that precise quantities may be dispensed in the case of a time-governed metering operation, it is thus necessary to keep the temperature of the liquid which is to be metered constant by means of a corresponding costly device. It is another object of the present invention to assure a precise metering operation without the expense of a control action on the temperature of the liquid which is to be dispensed.

If the sugar content of beverage syrup is raised beyond a known predetermined value, the beverage substance becomes self-preserving, i.e. does not require any additions or processing to prevent spoilage even in the case of long storage periods. With a very high sugar content, the risk exists however that the liquid forms crusts, or cakes onto the surface of its container, or forms streaks by precipitation of sugar at the points at which it comes into contact with the air. It is another object of the present invention to eliminate these disadvantages upon application of beverage syrup having a very high sugar content.

Beverage substances are commonly packaged and carried in packaging containers such as pails, bottles, beakers or the like. For a metered withdrawal, the packaging and cartage containers must be transferred into the storage vessel of a metering device. This is a complex operation, during which spillage resulting in contamination of the surroundings could easily occur. Such losses occurring during the transfer of the frequently highly viscous substances may be quite considerable. Beyond this, the syrup comes into large-area contact with the ambient atmosphere for a period during the transfer. It is necessary moreover to clean the storage vessel of the metering device before every new charging operation, to remove incrustations and to verify the unimpeded displaceability of the moving parts of the metering device. It is another object of the present invention to eliminate these difficulties and to assure that another stock quantity of the liquid which is to be metered may be made available to the metering device by a single action.

The object of the invention therefore primarily consists in developing a container of the kind specified in particular in the foregoing, in such manner that the container not only acts as a novel packaging for the liquid but is also endowed with features allowing of the volumetrically metered withdrawal of the quantity of liquid directly from the container in an automatic beverage dispenser in rapid sequence and with a high precision.

According to the present invention provision is made for a cup-shaped pressure compensating vessel which has its rim situated close to the withdrawal and venting opening and is open only towards this opening to be incorporated within the container which is also constructed as a packaging unit, for this vessel to form the closure of the container at the same time and to have its rim sealingly connected to the rim of the withdrawal and venting opening of the container.

In the operating position of the container, the cup-shaped compensator vessel situated within the container forms a downwardly open bell situated within the liquid, whereof the lower rim is situated close to the withdrawal aperture. This bell is in constant unobstructed communication with the external atmosphere and is thus filled with air under atmospheric pressure. The boundary between the liquid and the air is thereby positioned in the direct vicinity of the withdrawal and venting aperture, in similar manner to that described in U.S. Pat. No. 3,258,166. In the operating position, the bell however continues to be in unobstructed communication with the inside of the container and may simultaneously be placed in communication with the inside of the volumetric metering chamber of a corresponding metering device.

Upon occurrence of temperature fluctuations, a pressure change within the top space of the liquid may be prevented reliably whilst the container is in the operating position, since the gas within the top space may expand freely under the temperature fluctuations, a part of the liquid concomitantly being displaced into the inside of the bell. This means that, without the need for a cooling action on the liquid, the container may be placed in operation in combination with a volumetrically operating metering valve at any temperature and temperature fluctuation, the metered withdrawal always occurring under the same low pressure despite the temperature fluctuations with the said metering valve. Variations in viscosity resulting from fluctuations in the temperature also have no effect on the volumetric quantity metered.

This is because, when the container is situated in an inverted position in the operating position, a predetermined negative pressure whereof the magnitude is controlled by the interface between air and liquid situated deeply and closely above the withdrawal aperture, is engendered above the liquid surface within the container. This hermetic closure of the top space is of great importance for the withdrawal of highly viscous liquids. This also means however, that a great enclosed gas volume which undergoes quite considerable pressure variations during temperature changes, is present within the container upon partial draining. If a container of this kind were to have been drained down to a third during the metering operation, the result during a temperature change between 10° and 30° C may be either a destruction of the container or else a pressure such that the automatically operatable metering valve can no longer be placed in the open position against the arising pressure. Even upon opening the metering valve, the liquid would be expelled under high pressure, so that the precision of the metering operation is impaired thereby.

The novel container also has decisive advantages however, as a packaging and cartage container. The compensator vessel complementarily has the function, to this end, of forming the hermetic closure of the container after the packaging operation and during cartage. At the same time, it acts as a compensator vessel during the packaging operation or rather during cartage, since it has at least one wall portion which is outwardly bendable or elastically deformable under differential pressure. In this case, the inside of the compensator vessel remains in constant communication with the external atmosphere during packaging and cartage. This means that one and the same container is equally appropriate for packaging frozen liquid goods as well as unfrozen liquids such as highly viscous self-preserving liquids. In the case of frozen liquid goods, a definite top space always had to be left unfilled until now, which had to be filled with a protective gas in the case of delicate goods, for provident reasons. This represents a considerable complexity and thus also additional costs. The new container, in the development described, renders it possible to fill the charging space of the container to the brim with the liquid, so that no superjacent gas space remains.

To this end, the container is filled with a particular charging quantity. The compensator vessel is inserted into the same under displacement of the liquid and the air. The air may thereby be removed altogether from the charging space. It is only after this that the compensator vessel is sealingly connected to the rim of the container, e.g. by the swaging-on of a tear-off lid. Any protective measures, such as the introduction of protective gas, are eliminated.

This applies to freezing liquids as well as to self-preserving juices. Thanks to the total displacement of the air, there is no need to fear either flavor losses, impairment by oxidization, nor microbial action. During the volumetric expansion of the liquid (during the freezing action) no gas need be compressed in the superjacent space, since any superjacent space is eliminated. All volumetric changes, notwithstanding their cause and the instant of their occurrence, may be absorbed reliably, the compensator space concomitantly being in communication with the external atmosphere and does not allow an overpressure or an underpressure to be engendered. The container itself may moreover be produced from a material of lesser thickness or strength, since even volumetric changes occurring during impacts or the like are absorbed by the compensator vessel.

The compensator vessel thus serves the purpose of compensating volumetric changes of the liquid as well as for compensating the volumetric changes of the gas in the superjacent space of the container, when the same is in the operating position. At the same time, the compensator vessel forms the closure of the container.

In this way, the container may be constructed as a non-returnable or throw-away container and may be used in the simplest manner directly in an automatic beverage dispenser. The container may be produced very inexpensively and reliably and thus represents a cheap mass-production packaging device. The connecting paths for the metering operation are established automatically upon insertion into a metering apparatus.

A metering device comprising a metering chamber and constructed in particular manner, is advantageously connected to the container. It is essential in this connection that the metering chamber always be refilled under the same conditions, whilst the outlet opening of the corresponding withdrawal valve is closed. In particular, no different static pressures deriving from the column of liquid present within the storage container can exert any influence during the inflow of the liquid into the metering chamber. Thanks to the shifting of the boundary surface with the atmospheric air close to the withdrawal valve situated at the bottom side, the influence of the varying pressure of the column of liquid on the withdrawal operation is eliminated on the one hand, and it is assured on the other hand that the superjacent space increasingly enlarging above the surface of the liquid during the draining of the storage container is not in direct communication with the surrounding atmosphere. On the contrary, this space is closed off against the atmosphere by the column of liquid itself, so that a predetermined negative pressure is engendered in this space, which in view of the vapour pressure of the liquid ensures that no incrustations or formations of streaks occur within the storage container even in the case of a high sugar content. The storage vessel may consequently drain practically completely, without inconvenience, so that a cleaning operation on the storage vessel or on the corresponding metering device is unnecessary in most cases, prior to refilling.

In view of the new embodiment, viscosity changes resulting from temperature fluctuations, have no effect on the metered volumetric quantity, so that an action controlling the temperature of the liquid is superfluous as a rule.

Thanks to the measures specified, the charging periods always remain the same for the metering chamber, so that a chronologically controlled metering action is present despite the application of a metering chamber. The constant charging period has the advantage moreover that the metering cycles may follow each other at minimum intervals, so that a high dispensing performance with an ever constant quantity of liquid is obtained by means of the device.

In the case of the metering device comprising a refillable liquid storage container, as well as in that of the new packaging and cartage container, the venting vessel situated within the container not only fulfils the purpose of eliminating the action of the changing column of liquid on the withdrawal operation. On the contrary, the following considerations apply complementarily to this important feature: allowing of the elimination of this action in the presence of a single aperture only, situated at the bottom of the container; simultaneously allowing of direct venting of the metering chamber during the withdrawal; balancing all pressure fluctuations occurring during the sterilising process, during storage or cartage and during withdrawal or rather during an interval between two withdrawal operations, and allowing of the application of a container of one and the same kind for brim-full packaging of highly viscous syrupy liquids or of concentrates which are to be preserved under freezing action.

During the application of liquid freezing goods, the packaging and cartage container has the task moreover of considerably reducing the bulk of the packaging device (size of the container). Let this be described with reference to the following example:

A packaging device having a capacity of 880 cm$^3$, as used by the million today in practice, contains approx. 680 cm$^3$ of packaged merchandise. The residual 200 cm$^3$ are available for air or protective gases. The liquid expands by approximately 10% during the freezing process, i.e. approx. 750 cm$^3$ are then needed instead of 680 cm$^3$. The residual 130 cm$^3$ represent enclosed compressed air or enclosed compressed protective gases.

In application of the inventive cap, the packaging unit may be reduced by these 130 cm$^3$, since — in the uncollapsed state — the cap space requires no more than the volume required for the fluid during the freezing action, in view of change in volume. In view of the fact that the cap preferably consists of elastic material, it may be compressed to nothing or rather to a few cm$^3$.

The invention is described in particular with reference to diagrammatical drawings, in respect of several example of embodiment.

Figure 2:
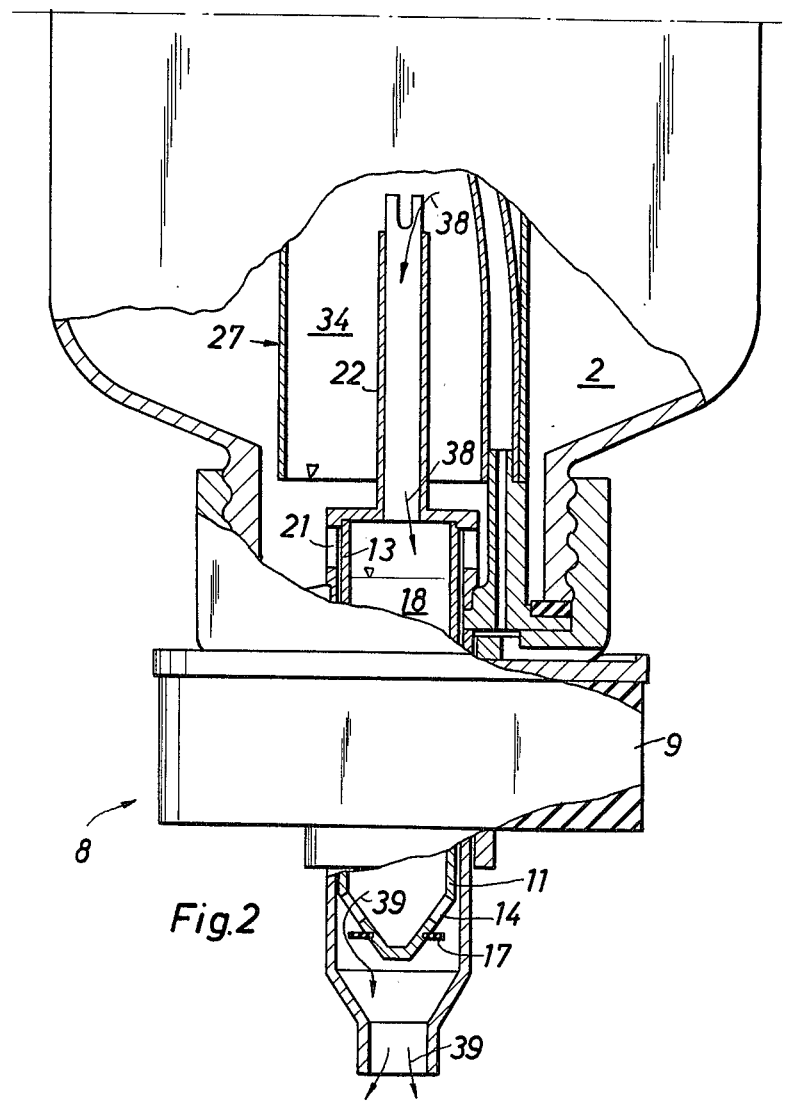
Figure 3:
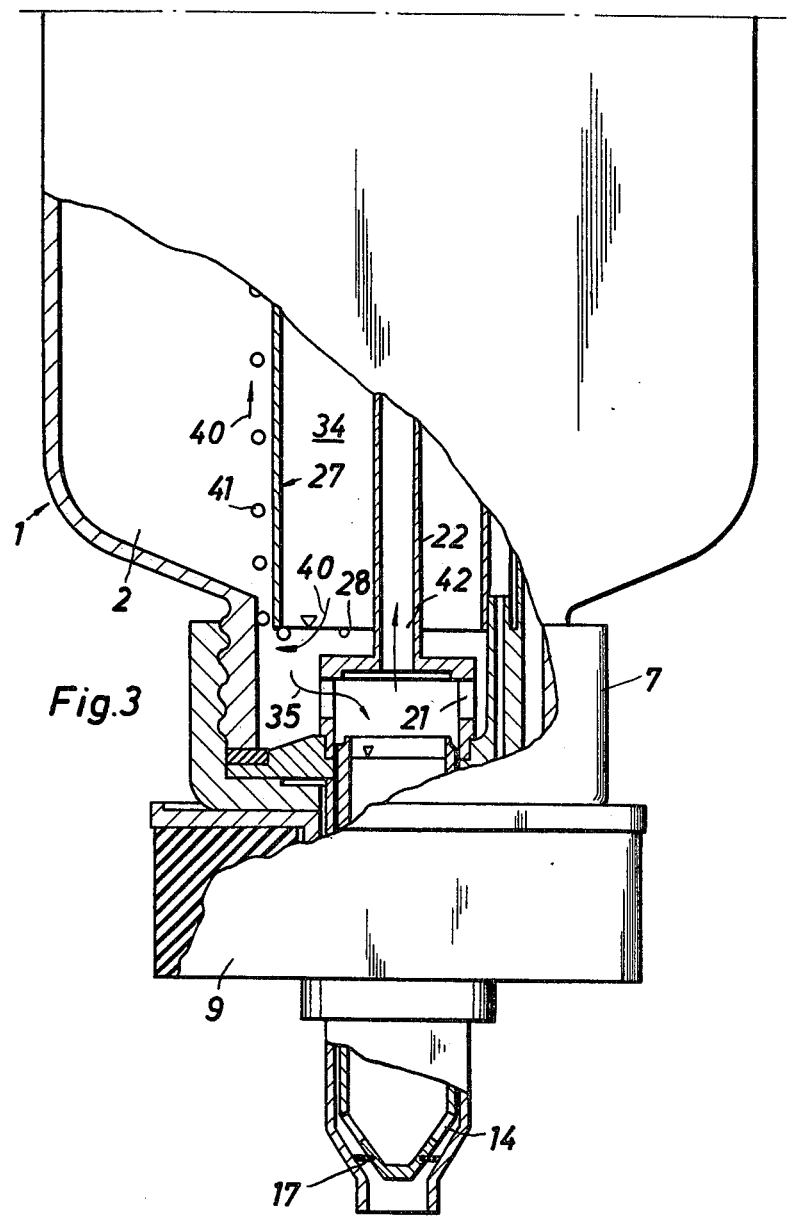

FIGS. 1 to 3 show a first example of embodiment of a metering device in accordance with the invention in different stages of a withdrawal cycle, in vertical cross-section, FIG. 4 shows a packaging and cartage container in accordance with the invention in a first form of embodiment, in vertical cross-section, FIG. 5 shows a second form of embodiment of a packaging and cartage container in accordance with the invention in the cartage condition, in partial cross-section, FIG. 6 shows the packaging and cartage container according to FIG. 5 in its operating position during the metered withdrawal of the liquid, and FIG. 7 shows another example of embodiment for a packaging and cartage container in accordance with the invention, in vertical cross-section.

According to FIGS. 1 to 3, a withdrawal device in accordance with the invention comprises a storage container 1 for the liquid 2 which is to be metered, which in the omnilaterally closed container in the example illustrated has a level which is shown at 3 and which in the closed upper part leaves a superjacent space 4 free of liquid, which is normally under a lesser pressure than the atmospheric pressure for reasons remaining to be explained further on, so that a vaporization pressure may be set up within this superjacent space, which even in the case of liquids having a high sugar content reliably prevents any incrustation or forming of stripes. It is apparent that the liquid surface 3 is not in any direct communication with the external atmosphere.

In its base area, which extends sloping downwards frustoconically towards the center, the storage container has an aperture delimited by a container neck or stub 5. A screw cap 7, which acts as a holder for a withdrawal valve 8 which may be actuated electromagnetically in the example illustrated, may be connected to the same, e.g. by means of the external screw-thread of the container neck 5. An insert element 23 which cooperates sealingly with the end face of the container neck under interposition of an annular seal 6, is situated within the screw cap 7.

The withdrawal valve comprises a magnet system 9 which may be actuated electromagnetically, and a corresponding protective cap 10 which within a central sleeve-like section receives a guiding sleeve 12 for a hollow armature 11 which is equally constructed in sleeve form. The hollow armature 11 is open at its rearward extremity and at its downwardly or outwardly pointing extremity is frustoconically constructed and closed off, one or more outlet openings 14 being incorporated in the frustoconical surface. Below the outlet openings 14, the cone section 16 of the armature 11 has an external annular seal 17 which cooperates in valve-like manner with the frustoconically tapering extremity 15 of the guiding sleeve 12. At its rearward extremity, the armature 11 is extended by a slide-like sleeve of non-magnetic material. The free upper extremity thereof extends into a part 20 of the insert 23 which is upwardly closed and within its cover carries an upwardly projecting small tube 22 or the like. One or more entry openings 21 through which the contents of the storage container 1 may flow according to the arrows 35 into the metering chamber 18 formed by the armature 11 and the extension 13, is or are incorporated under the cover. The volume of this metering chamber is matched precisely to the liquid volume to be withdrawn during a metering operation and specified in advance in each case.

A venting container 27 in the form of a downwardly open vessel is situated closely above the insert 20, 23 in the storage container 1. The small tube 22 which is in communication with the metering chamber 18 extends into the venting chamber 34. The insert 23 moreover has an extension projecting upwardly into the venting chamber 34, wherein is incorporated a bore 24. The extension may be extended by a hose 25, in such manner that the passage 24 opens into the venting chamber 34 at a highly situated point, according to the arrow 30. At the other extremity, the passage 24 is in direct communication with the atmosphere via a channel 26 in the screw cap 7, as shown directly above the magnetic coil 9 by the arrow 30. It is assured in this manner, that actual atmospheric pressure prevails in the venting chamber 34, that is to say within a gas space, enclosed within the venting vessel 27, which is in contact in the area of the lower rim 28 of the venting vessel with the liquid within the container 1, and forms a boundary surface with this liquid which determines the static pressure above the withdrawal valve 8, that is to say independently of the varying height of the column of liquid present within the container 1. The liquid consequently always flows into the metering chamber 18 through the openings 21 under the same static pressure, because the liquid always tends to penetrate communicatingly into the venting chamber 34. As in a pipette, it always ensures that a constant negative pressure is established in the superjacent space 4.

Whereas the valve armature 11 assumes the closed position shown in FIG. 1 as a result of gravity, the electromagnetic actuating coil 9 which pulls the armature 11 upwards according to FIG. 2, is switched on to initiate a withdrawal operation. The displacement of the armature 11 leads to a lifting of the slider sleeve 13 which is sealingly thrust before the inflow openings 21 of the insert as shown by FIG. 2. At the same time, the outflow from the metering chamber through the outlet openings of the armature valve according to the arrows 39 is freed by the armature displacement. The liquid present in the metering chamber may flow out freely since the inner extremity of the metering chamber is vented direct via the small tube 22, as shown by the arrow 38. The direct venting of the metering chamber concomitantly occurs from the venting chamber 34. The inflow of air under atmospheric pressure is thus switched to from the inflow of liquid, by the actuation of the valve. The small tube 22 ensures that the liquid may flow into the metering chamber 18 only via the inflow openings 21, in all circumstances.

The actuating coil 9 is switched off after a predetermind period, so that the valve sleeve again drops into the original position under the action of gravity, in which the seal 17 on the armature cone shuts off the outflow openings 14 of the metering chamber, whereas the inflow openings 21 at the upper extremity of the metering chamber are freed at the same time. Liquid may thus flow into the metering chamber again from the container 1 under constant low static pressure according to the arrow 35 (FIG. 3). The air concomitantly displaced is displaced into the venting chamber 34 via the small tube 22, according to the arrow 42. The liquid level drops upon outflow of the liquid from the storage container. The negative pressure is maintained in the superjacent gas space 4 situated above the liquid. The atmospheric pressure prevailing in the venting chamber 30 then ensures that a corresponding quantity of air in the form of bubbles flows upwards according to the arrows 40 over the lower rim 28 of the venting vessel 27 and through the column of liquid into the superjacent gas space 4, that is to say in such manner that the same static pressure always prevails above the inflow openings 21 of the withdrawal valve. The inflow thus occurs wholly uniformly, so that the filling of the metering chamber occurs in identical periods, that is to say independently of the liquid level in the storage vessel. After a predetermined period has elapsed, another withdrawal operation may be initiated by actuation of the electromagnetic coil 9.

After complete draining of the storage vessel 1, the withdrawal valve may be removed by means of the holder 7 and the container may be refilled, the venting vessel and the corresponding parts also being removed from the storage container, together with the removal of the withdrawal valve.

To avoid repeated refilling of one and the same storage vessel of a withdrawal device, a packaging and cartage container for the liquid which is to be metered, is specified in FIG. 4. This container 50 is in the form of a large flask comprising a container barrel 51 and a container neck 52 and may consist of any appropriate material, in particular of an inert plastics material. The container neck has an external screw-thread for a screw cap 53 which serves the purpose of hermetically shutting off the packaging and cartage container until its use. To this end, a flange 54 of an insert element, acting as a sealing ring, is incorporated between the cap 53 and the end face of the container neck 52. This insert element simultaneously forms a venting vessel 56 projecting into the packaging and cartage container 50, which in the area of the flange has an opening 59 into which the head portion 64 of a withdrawal valve may be sealingly inserted after the screw cap 53 has been removed and replaced by a screwable holder of the withdrawal valve. The parts of the withdrawal valve projecting into the inside of the venting vessel 56, are shown dash-dotted at 64. The venting vessel 56 encloses a venting chamber 58, which is filled with air or an inert gas, and closed off by the liquid 60 within the container.

FIG. 4 shows the packaging and cartage container in the cartage position, in which the container neck 52 points upwards. For use in combination with a withdrawal device, the container is inverted so that the opening openable by means of the screw cap 53 is a base opening of the container 51 during the withdrawal.

Close to the container neck 52, the venting vessel 56 has at least one prefabricated opening 62 which may be closed off for cartage, e.g. by means of a tear-off element 63. A closure or covering of the opening 62 is not absolutely necessary since the packaging container is outwardly sealed off by the screw cap 53 and the corresponding seal. If it is not wished however to seal the internal space 58 of the venting vessel 56 with the liquid which is to be metered, it may be appropriate to provide a cover 63 for the opening 62, for example in the form of a pull-off adhesive foil.

In the example illustrated, the flange 54 should already be incorporated in one piece with the venting vessel 56 and the connecting passage 57 for the direct connection of the venting chamber 58 to the external atmosphere via an appropriate section 55. Upon placing the withdrawal valve in position, a corresponding extension of the withdrawal valve is automatically positioned in the externally situated extremity of the passage 57 and thereby establishes the required connection.

The liquid level 61 is situated close to the container neck 52 in the cartage or storage position. By contrast, the liquid level is initially situated close to the extremity facing away from the container neck, of the packaging and cartage container 50, in the withdrawal position.

The cartage and packaging container is appropriately constructed as a throw-away or non-returnable container and may be produced from appropriate materials at correlatively low cost. The venting vessel 56 is concomitantly associated with two tasks, namely the forming of the venting chamber during the withdrawal operation as well as the sealing of the container 50 by means of the flange prior to the first opening of the container.

Yet another task may be associated with the venting vessel, namely to ensure that all occurring pressure fluctuations or pressure differences from atmospheric pressure are reliably compensated during the filling of the packaging container or during cartage and storage. This may be of importance in particular, if the liquid charged is exposed to a temperature treatment, e.g. a freezing process.

An example for this is shown by FIGS. 5 and 6, wherein is specified a packaging and cartage container 70 of the kind described with reference to FIG. 4, on whose screw neck 71 is screwed on a screw cap 75 which sealingly co-operates with the end face of the container neck with interposition of the flange 74 of a venting vessel 72.

The venting vessel 72 is of omnilaterally closed construction and does not have any prefabricated opening for connection to the contents of the packaging container. The venting vessel 72 is so constructed however that it has at least one wall portion which is flexible or elastically outwardly bendable, which upon occurrence of pressure differences between the inside of the packaging container and the external atmosphere receives the concomitantly occurring volumetric change in major proportion or completely. It becomes possible thereby to fill the packaging container 70 completely, almost without superjacent space.

To obtain a connection to the inside of the packaging container for withdrawal purposes, the venting vessel 72 in the example illustrated has a shoulder extension 73 close to the neck 71, which may also extend throughout the periphery or over different peripheral portions. In the example illustrated, the shoulder 73 is limited to a small peripheral portion.

Upon installing the withdrawal valve 80 by means of a screw cap 81 according to FIG. 6, the shoulder 73 is preferably automatically transpierced, that is to say with one or more projections 82 sharpened at 83 in blade-like manner, of the insert appertaining to the withdrawal valve, whereon the venting passage 86 and the small tube 85 for the metering chamber, are also situated. The connection between the venting chamber 72 and the inside of the packaging container 70 is opened thereby, so that the liquid may flow into the metering chamber according to the arrow 84. The venting chamber is in direct communication with the external atmosphere at 87.

A hollow extension projecting into the inside of the venting chamber, which is severed by a cutting edge on the withdrawal valve upon installing the withdrawal valve, so that an opening lies open, which is lateral and projects radially with respect to the axis into the inside of the venting chamber, may also be provided as a portion of the venting vessel which is to be opened during the affixing of the withdrawal valve. A peripheral portion of the venting vessel 72 may however also be weakened beforehand, so that this part may easily be transpierced upon affixing the withdrawal valve or earlier by the operative.

In this packaging container, the screw cap 75 merely serves the purpose of protecting the internal space of the venting vessel 72 against soiling or the like. The screw cap 75 does not have a sealing function however, in respect of the inside of the venting vessel 72. On the contrary, the cap base should be air-permeable in this example of embodiment, so that the venting vessel may simultaneously be able to fulfil its other pressure compensating task. To this end, two bores 76 for example are incorporated in the cap base through which the air may escape to the outside during incurvation of the walls of the venting vessel 72 into the position shown dash-dotted at 72a.

These openings may simultaneously serve the purpose of receiving the projections 77 of a spanner 78 whereby the screw cap 75 may be unscrewed by application of little force, upon placing the packaging container in operation.

It is pointed out in this connection that any other appropriate fastening system may be incorporated in the area of the aperture of the packaging container 70 for a closure cap and for the holder of the withdrawal valve, e.g. a catch closure or a bayonet joint or the like.

It was found to be particularly advantageous for the function of the exclusive sealing of the packaging container to be coordinated with the venting vessel which is firmly installed in the throw-away container. To this end, the area of the venting vessel 95 close 93 the open extremity may be firmly bonded or welded to the inner side of the container neck 91, according to FIG. 7. In this case, the flange 94 still has a sealing function only with the withdrawal valve installed. The flange 94 need not perform a sealing action during cartage or storage of the packaging container. In the example illustrated, the part of the venting vessel 93 situated within the packaging container 90 is constructed as a bellows having folds 95 parallel to the axis, so that the venting vessel 93 may compensate for great volumetric changes under pressure variations, without changing its shape fundamentally. The internal space 92 of the packaging container may thereby be filled reliably up to the brim. The losses of packaging space are thereby extraordinarily small and the packaging container itself may be constructed in adequately weak form since the possible pressure fluctuations cannot lead to any dangerous loading of the container barrel. An encircling shoulder is incorporated at 96, which may be transpierced by the withdrawal valve in the area of a fold 95 open towards the inside of the venting vessel, upon placing the container in operation. A fin or recess which cooperates with a corresponding projection or depression on the withdrawal valve, so that the withdrawal valve may be placed on the neck 91 of the storage container only in a predetermined relative peripheral position, may be situated at a particular peripheral point in the marginal area of the venting vessel. It is assured thereby that the shoulder 96 may in each case be transpierced only at a predetermined point. The folds 95 may also be situated transversely to the axis of the container.

A tear-off adhesive foil 97 comprising a gripping tab 98 which has venting openings at 99, may be drawn over the free end face of the flange, merely as a protection against dirt or dust and as a protection for the flange 94. Instead of this, a lightweight and air-permeable screw cap 100 may moreover be incorporated again however, as shown dash-dotted.

We claim:

1. A container for metered dispensing of liquids, in particular for freezable or self-preserving liquids, an atmosphere external to the container, said container comprising a withdrawal and venting aperture which is pointing downwards in withdrawing position and is connected to a metering device, characterized in that in the inside of the container, there is provided an inverted cup-shaped compensating vessel with its rim arranged close to the withdrawal and venting aperture and open only towards this aperture, said compensating vessel having its rim sealingly connected to the rim of the withdrawal and venting aperture of the container.

2. A container as claimed in claim 1, characterized in that the interior of the compensating vessel is in constant open communication with the atmosphere external to the container whilst the outside of the compensating vessel is in open communication only with the material inside of the container, and that said compensating vessel is provided with at least one wall deformable under differential pressure.

3. A container as claimed in claim 1, characterized in that in close vicinity of the withdrawal and venting aperture the compensating vessel is provided with an openable connecting section leading to the inside of the container.

4. A container as claimed in claim 2, characterized in that the compensating vessel is outwardly protected by an air-permeable cover, especially a tear off cover.

5. A container as claimed in claim 3, characterized in that the compensating vessel is outwardly protected by an air-permeable cover, especially a tear off cover.

6. A container as claimed in claim 3, characterized in that the openable connecting section of the compensating vessel comprises an inwardly projecting shoulder section for transpiercing by means of a pierce device.

7. A container as claimed in claim 1 used as a freezing container, characterized in that for securing the metering device the container is provided with a section which is independent of the compensating vessel which compensating vessel acts as a closure.

8. A container for metered dispensing of liquids, in particular for freezable or self-preserving liquids, including a withdrawal and venting opening which in operation is directed downwards in a dispensing position, an inverted cup-shaped pressure compensating vessel which has its rim situated close to the withdrawal and venting aperture and is open only towards this aperture incorporated within the container, the vessel simultaneously forming the closure of the container and having its rim sealingly connected to the rim of the withdrawal and venting aperture of the container, the interior of the pressure compensating vessel being in constant unobstructed communication with an atmosphere external of the container as well as being in communication with the material inside of the container, said pressure compensating vessel having at least one wall portion which is deformable under differential pressure, a withdrawal valve including a metering chamber connected to the inside of the container and to the pressure compensating vessel via an upwardly extending passage, which withdrawal valve is electromagnetically actuated and equipped with a movable valve element constructed as an armature, characterized in that the valve element conjointly with a sleeve guiding it delimits the metering chamber and that the guiding sleeve is constructed with individual openings for the liquid which is to be metered opening into the inside of the container at its upper extremity, and that the valve sleeve is constructed as a valve slider for alternating uncovering or covering the entry openings.

* * * * *